US012276581B2

(12) United States Patent
Peng et al.

(10) Patent No.: US 12,276,581 B2
(45) Date of Patent: Apr. 15, 2025

(54) MONITORING DEVICE FOR MANGROVE SOIL RESTORATION

(71) Applicant: Guangdong Ocean University, Zhanjiang (CN)

(72) Inventors: Xiaohong Peng, Zhanjiang (CN); Ying Ding, Chaozhou (CN); Shiyi Xie, Zhanjiang (CN); Shufu Lin, Zhaoqing (CN); Zhaohong Zhu, Zhanjiang (CN); Jiahui Chen, Jiangmen (CN)

(73) Assignee: Guangdong Ocean University, Zhanjiang (CN)

( * ) Notice: Subject to any disclaimer, the term of this patent is extended or adjusted under 35 U.S.C. 154(b) by 165 days.

(21) Appl. No.: 18/107,530

(22) Filed: Feb. 9, 2023

(65) Prior Publication Data
US 2023/0304901 A1    Sep. 28, 2023

Related U.S. Application Data

(63) Continuation of application No. PCT/CN2022/124094, filed on Oct. 9, 2022.

(30) Foreign Application Priority Data

Mar. 22, 2022   (CN) .......................... 2022102829682

(51) Int. Cl.
*G01N 1/08*   (2006.01)
(52) U.S. Cl.
CPC ...................... *G01N 1/08* (2013.01)
(58) Field of Classification Search
CPC ............................... G01N 33/24; G01N 1/08

USPC ...................................................... 73/864.41
See application file for complete search history.

(56) References Cited

FOREIGN PATENT DOCUMENTS

| CN | 211401757 U | | 9/2020 |
|---|---|---|---|
| CN | 213148366 U | | 5/2021 |
| CN | 213812957 U | | 7/2021 |
| CN | 214196221 U | * | 9/2021 |

(Continued)

OTHER PUBLICATIONS

CNIPA, Notification of a First Office Action for CN202210282968. 2, Jan. 12, 2023.

(Continued)

*Primary Examiner* — Daniel S Larkin
*Assistant Examiner* — Nashmiya S Fayyaz
(74) *Attorney, Agent, or Firm* — Hemisphere Law, PLLC; Zhigang Ma

(57) ABSTRACT

A monitoring device for mangrove soil restoration includes a body, each of four corners of a lower surface of the body is provided with a locking universal wheel, a central position of the body is provided with a piling hole passing through the body, an upper surface of the body is connected to a frame, two inner surfaces of the frame are provided with sliding grooves, the sliding grooves are movably connected to a pile device, a lower surface of the pile device is provided with a round tube, the round tube is disposed above the pilling hole, two sides of the frame are provided with two fixing holes respectively, the two fixing holes are provided a stop rod therethrough. The monitoring device avoids that soil sampling is generally conducted after deep excavation with shovel manually, which saves manpower and the surrounding soil will not affect sampling results.

5 Claims, 7 Drawing Sheets

(56) References Cited

FOREIGN PATENT DOCUMENTS

| CN | 214199915 U |   | 9/2021  |
|----|-------------|---|---------|
| CN | 214832675 U |   | 11/2021 |
| CN | 216064829 U | * | 3/2022  |

OTHER PUBLICATIONS

Guangdong Ocean University (Applicant), Replacement claims (allowed) for CN202210282968.2, Mar. 31, 2023.
CNIPA, Notification to grant patent right for invention in CN202210282968.2, Apr. 14, 2023.

* cited by examiner

MONITORING DEVICE FOR MANGROVE SOIL RESTORATION

TECHNICAL FIELD

The disclosure relates to a monitoring device for soil restoration.

BACKGROUND

Mangrove is one of the marine ecosystems with the best productivity in the sea-land interlaced zone of tropical and subtropical coastal zones. Mangrove plays a very important role in purifying seawater, preventing wind and waves, maintaining biodiversity, and carbon sequestration. In recent years, China has made positive progress in the protection and restoration of mangroves, initially reversing the trend of rapid reduction of mangrove area. In the process of mangrove restoration, the most important is to restore the soil, which is a technical solution to restore the normal function of contaminated soil.

During soil restoration, the soil at different depths needs to be sampled and tested, and then restoration measures are used. The current soil sampling is generally performed after manual deep excavation by shovel, this way to sample the soil is labor-intensive, and the soil surrounding the sampling position can affect sampling results.

SUMMARY

A purpose of the disclosure is to provide a monitoring device for mangrove soil restoration, which can solve the problem described in the background that soil sampling is generally performed after manual deep excavation by shovel, which is labor-intensive, and the soil surrounding the sampling position can affect sampling results.

Technical solutions to solve the above purpose are: a monitoring device for mangrove soil restoration, including a body, where each of four corners of a lower surface of the body is provided with a locking universal wheel; a central position of the body is provided with a piling hole passing through the body; an upper surface of the body is connected to a frame, two inner surfaces of the frame are provided with sliding grooves, the sliding grooves are movably connected to a pile device, a lower surface of the pile device is provided with a round tube, and the round tube is disposed above the pilling hole; two sides of the frame are provided with two fixing holes respectively, the two fixing holes are provided a stop rod therethrough, and an upper surface of the stop rod is in contact with the lower surface of the pile device; two ends of the body are provided with two hydraulic cylinders respectively, two telescopic rods of the two hydraulic cylinders are configured to pass through the body, and the two telescopic rods are connected to a support plate individually.

In an embodiment, the body is connected to a fixing ring, the fixing ring is disposed above the pilling hole, a side of the fixing ring is threaded with adjusting rods, a first end of each of the adjusting rods is connected with a handle, a second end of each of the adjusting rods opposite to the first end of each of the adjusting rods is movably connected to a rotary wheel, and the rotary wheel is disposed in the fixing ring.

In an embodiment, the pile device includes a housing, an outer surface of the housing is connected to a first motor, an output end of the first motor is configured to pass through the housing and connect to a first gear; a rotation shaft is connected to the housing, the rotation shaft is configured to pass through the outer surface of the housing from an inner of the housing, and a surface of the rotation shaft is movably connected to a first surface of a second gear; the first gear is configured to engage with the second gear, and a first end of a rotation rod is movably connected to a central position of a second surface of the second gear opposite to the first surface of the second gear; a second end of the rotation rod opposite to the first end of the rotation rod is movably connected to a first end of a connecting rod, a second end of the connecting rod opposite to the first end of the connecting rod is movably connected to a first end of a second push rod, and a second end of the second push rod opposite to the first end of the second push rod is connected to a first end of a first spring; a second end of the first spring opposite to the first end of the first spring is connected to an inside of a first push rod, the first push rod is configured to pass through the round tube and extends from a lower surface of the round tube, and an outer surface of the first push rod is sleeved with a second spring; and the second spring is disposed in the round tube, the outer surface of the first push rod is provided with a protrusion, and a surface of the protrusion is clamped in middle of the second spring.

In an embodiment, an upper surface of the pile device is provided with a ring.

In an embodiment, an upper surface of the frame is provided with a second motor and a pulley, an output end of the second motor is connected to a rotary table, a first end of a wire rope is connected to the rotary table, a second end of the wire rope opposite to the first end of the wire rope is connected to a hook, the wire rope is configured to pass through the upper surface of the frame through the pulley, and the hook is in contact with the ring.

In an embodiment, the upper surface of the body is provided with a battery pack.

In an embodiment, a lower surface of the first push rod is connected to a pressure plate, and an upper surface of the pressure plate is threaded with at least one pressure block.

In an embodiment, a lower surface of the pressure plate is provided with at least one rubber mat.

Technical Effects of the Disclosure

1. A frame is disposed on a body and the frame is provided with a pile device, and the pile device strikes an upper surface of a sampling pipe and drives the sampling pipe into underground at a required sampling position. The disclosure avoids manpower consumption and surrounding soil will affect the sampling results when soil sampling is conducted after manual deep excavation by shovel.

2. The body is provided with a pilling hole and a fixing ring is disposed above the pilling hole, the fixing ring is provided with adjusting rods, the adjusting rods are provided with rotary wheels respectively, and the rotary wheels fix the sampling pipe. The disclosure ensures perpendicularity when the pile device strikes the sampling pipe, avoids inclination of the sampling pipe, and can also adapt to sampling pipes of different specifications.

3. A ring is disposed above the pile device, and the pile device is pulled to a top of a frame by pulling the ring through a wire rope, then the pile device is fixed on the frame by a stop rod, and the sampling pipe in the underground is also pulled by the wire rope. The disclosure saves manpower.

4. A pressure plate is threaded with at least one pressure block, and the striking force of the pile device is increased by increasing the number of the pressing blocks, which improves sampling effects when the pile device strikes the sampling pipe.

Figure 1:
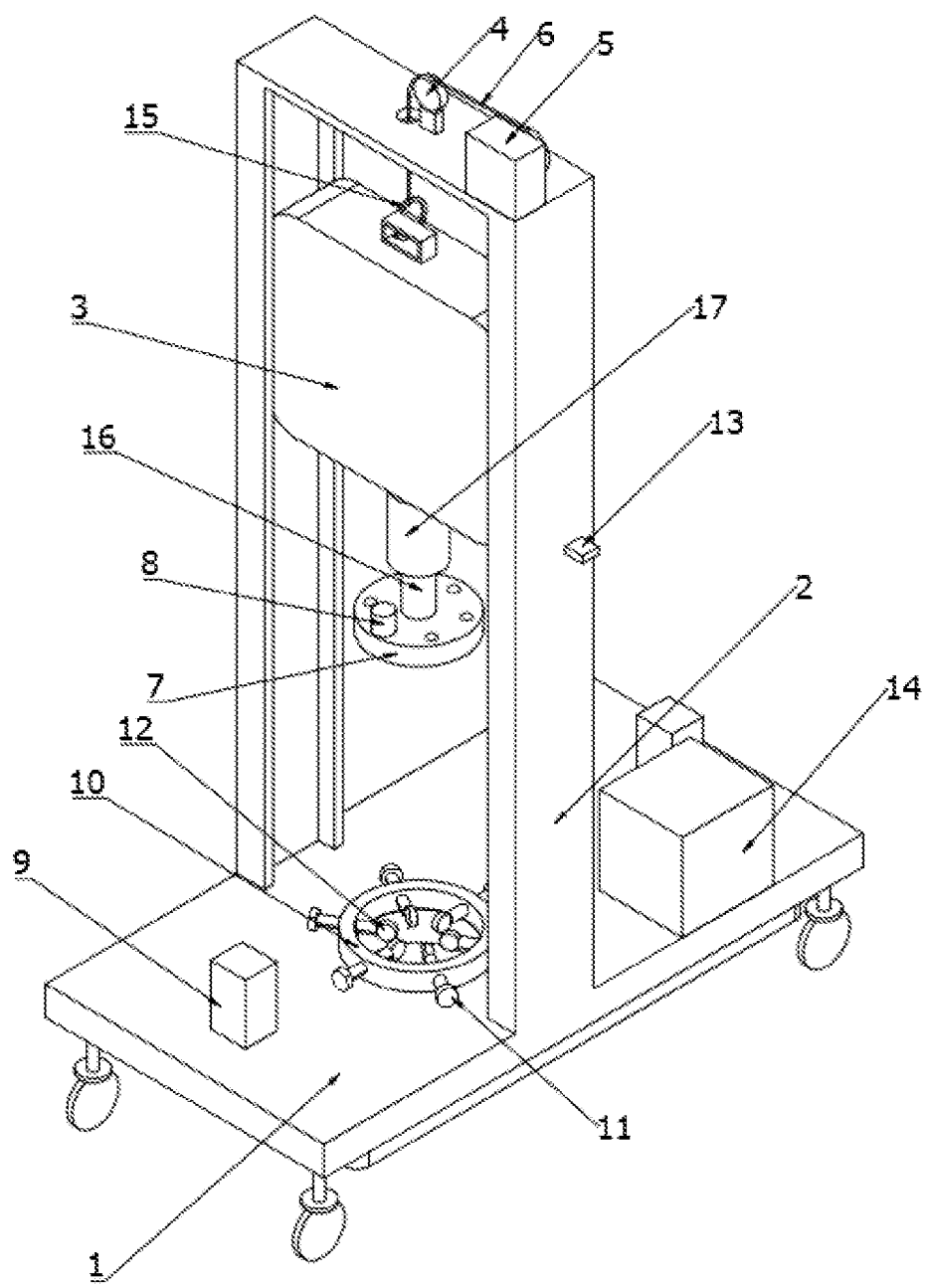
FIG. 1 is an overall view of a monitoring device for mangrove soil restoration according to an embodiment of the disclosure.

DESCRIPTION OF REFERENCE NUMERALS 1-body; 2-frame; 3-pile device; 4-pulley; 5-second motor; 6-wire rope; 7-pressure plate; 8-pressure block; 9-hydraulic cylinder; 91-telescopic rod; 10-fixing ring; 11-adjusting rod; 12-rotary wheel; 13-stop rod; 14-battery pack; 15-hook; 16-first push rod; 17-round tube; 18-support plate; 19-pilling hole; 20-first motor; 21-first gear; 22-second gear; 23-rotation shaft; 24-rotation rod; 25-connecting rod; 26-second push rod; 27-first spring; 28-second spring; 29-ring; 30-protrusion; 31-rotary table.

DETAILED DESCRIPTION OF EMBODIMENTS

The technical solution of the disclosure will be described clearly and completely in combination with the drawings. In the description of the disclosure, it should be noted that terms, such as "center", "top", "bottom", "left", "right", "vertical", "horizontal", "inside", and "outside", indicate orientations or position relationships based on orientations or position relationships shown in the drawings, only for the convenience of describing the disclosure and simplifying the description, rather than indicating or implying that the device or element referred to must have a specific orientation. It is constructed and operated in a specific orientation, and therefore cannot be understood as a limitation of the disclosure. In addition, the terms "first", "second" and "third" are only used to describe the purpose and cannot be understood as indicating or implying the relative importance.

The disclosure will be further described below in combination with the drawings.

Figure 2:
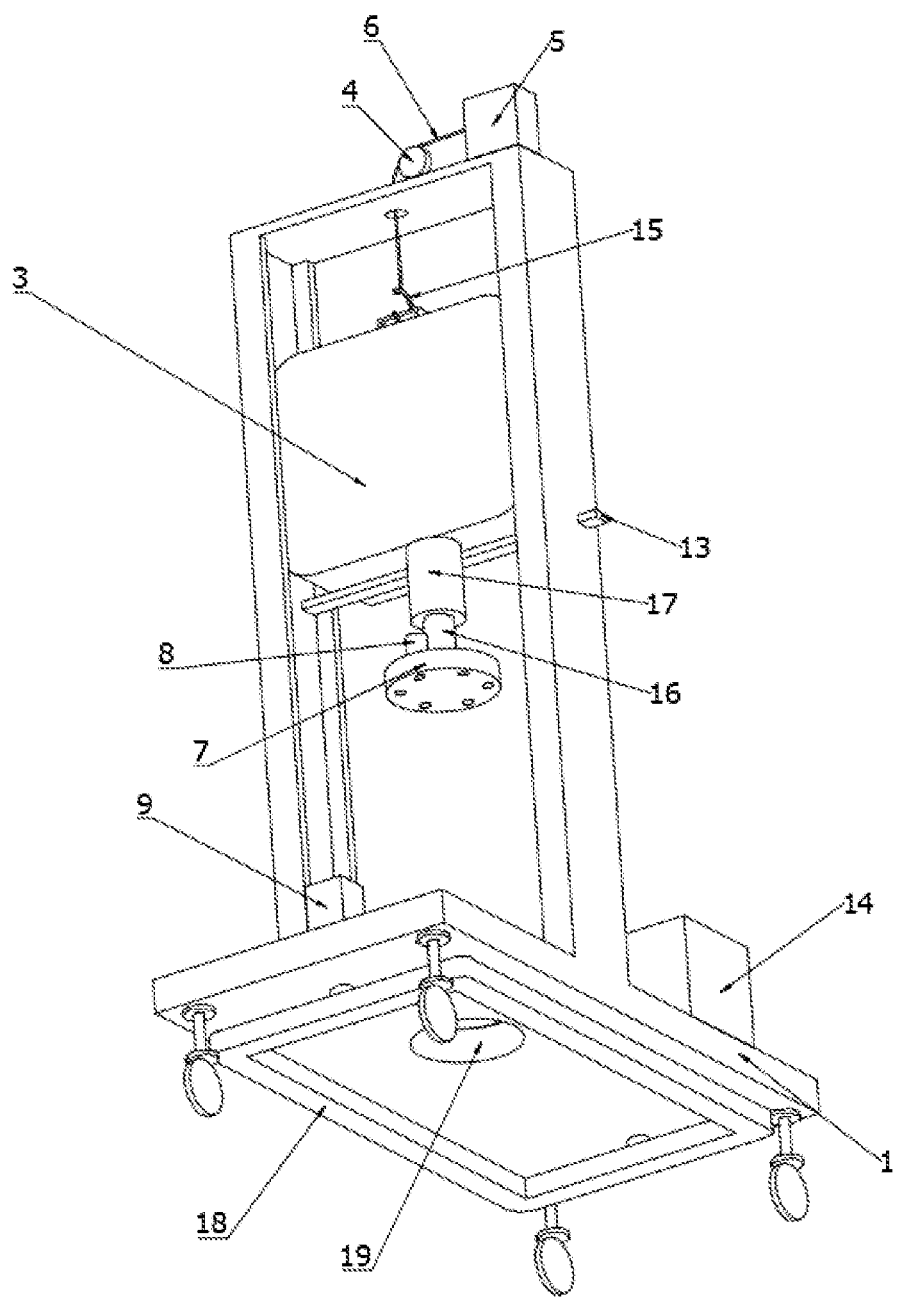
FIG. 2 is an overall bottom view of a monitoring device for mangrove soil restoration according to an embodiment of the disclosure.
Figure 3:
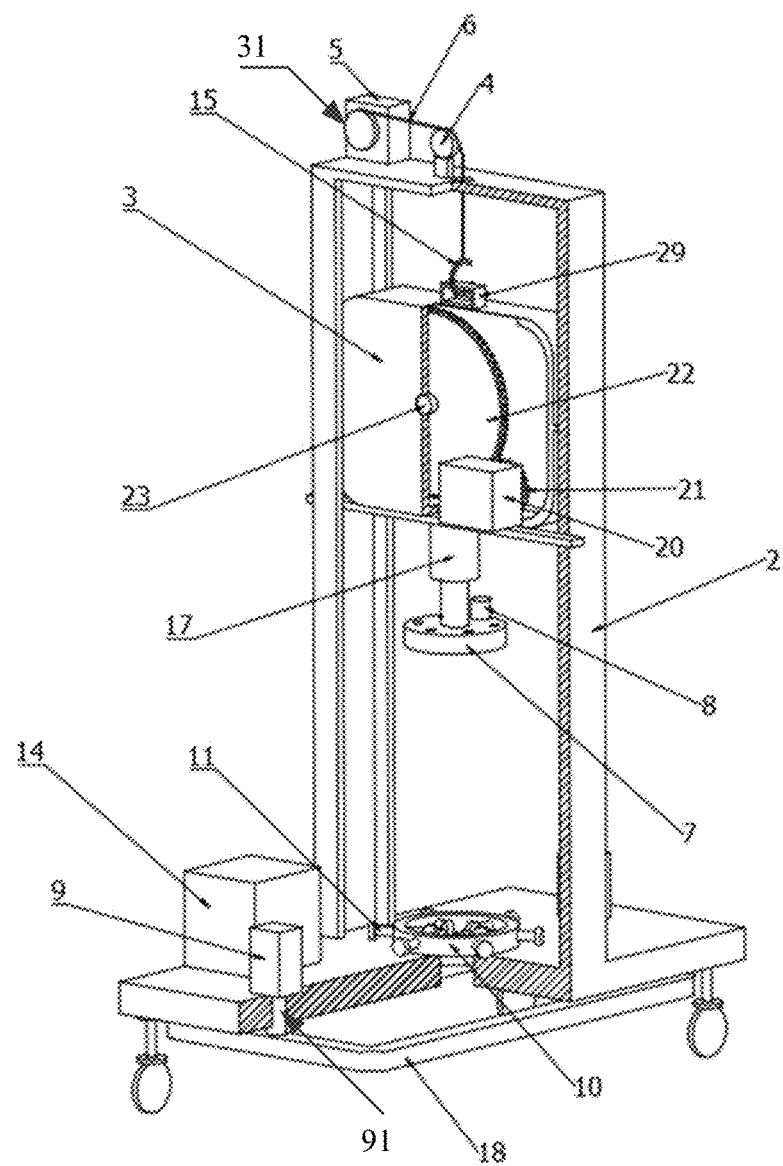
FIG. 3 is a back sectional view of a monitoring device for mangrove soil restoration according to an embodiment of the disclosure.
Figure 4:
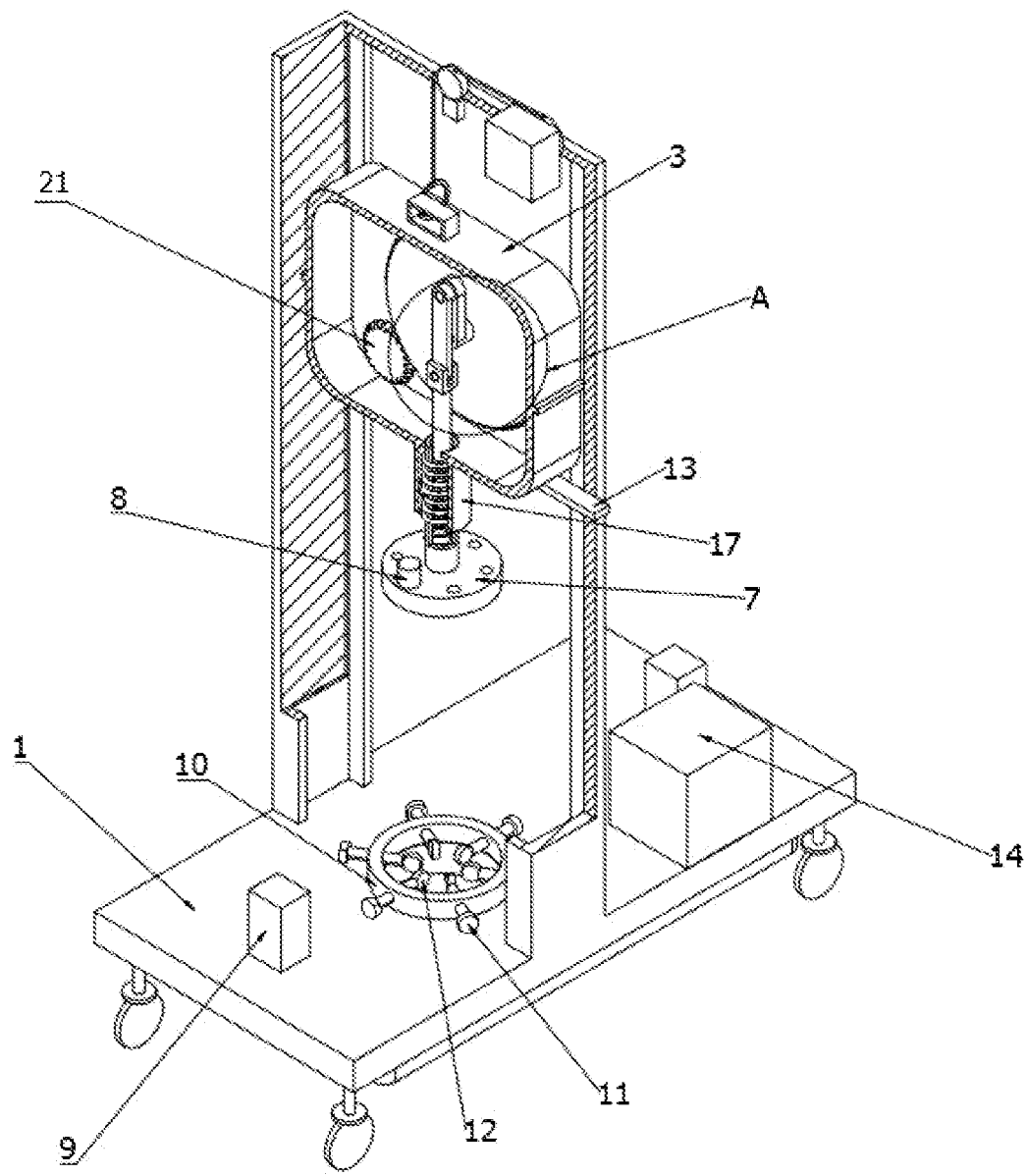
FIG. 4 is a front sectional view of a monitoring device for mangrove soil restoration according to an embodiment of the disclosure.
Figure 5:
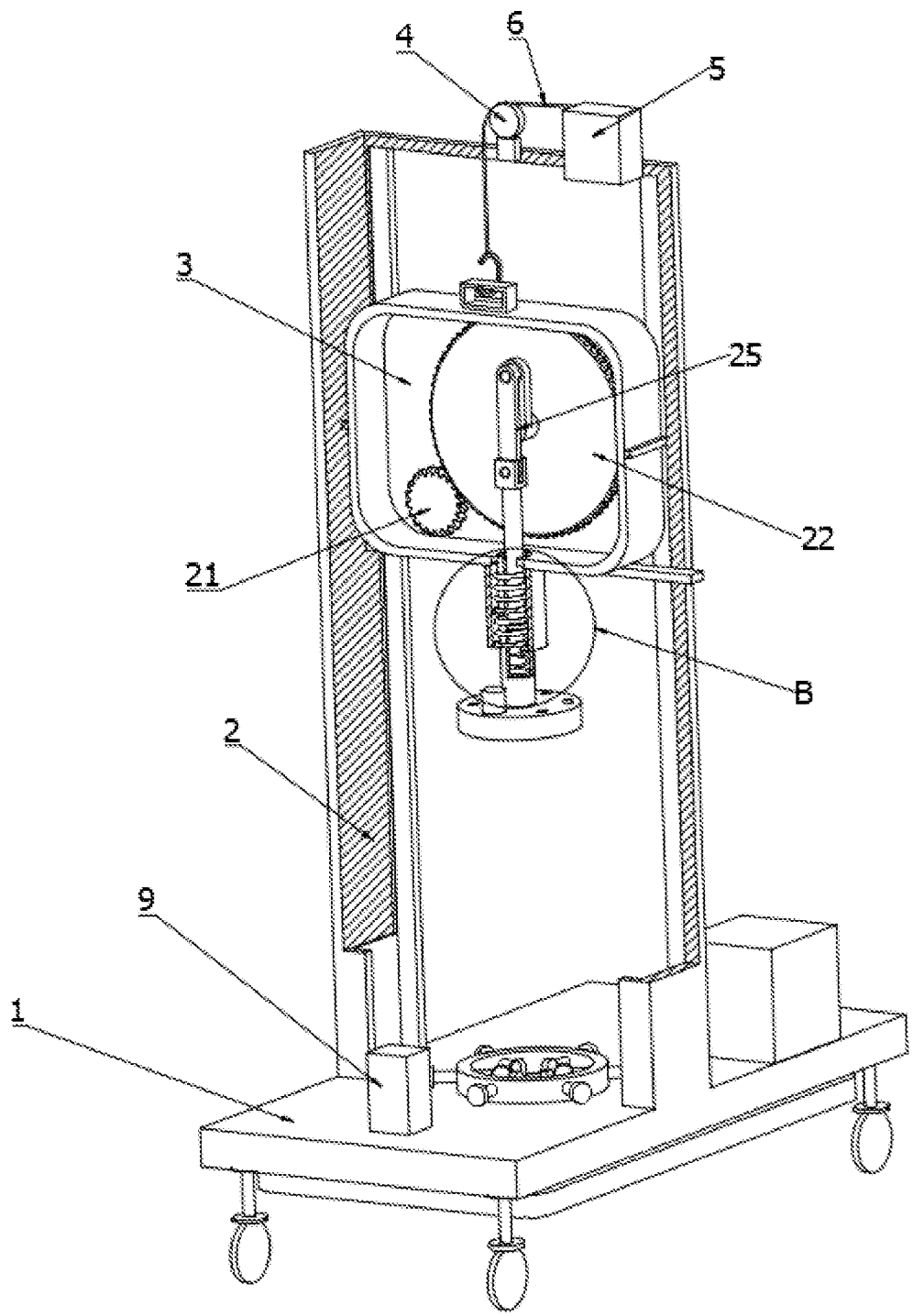
FIG. 5 is a front sectional view in another angle of a monitoring device for mangrove soil restoration according to an embodiment of the disclosure.
Figure 6:
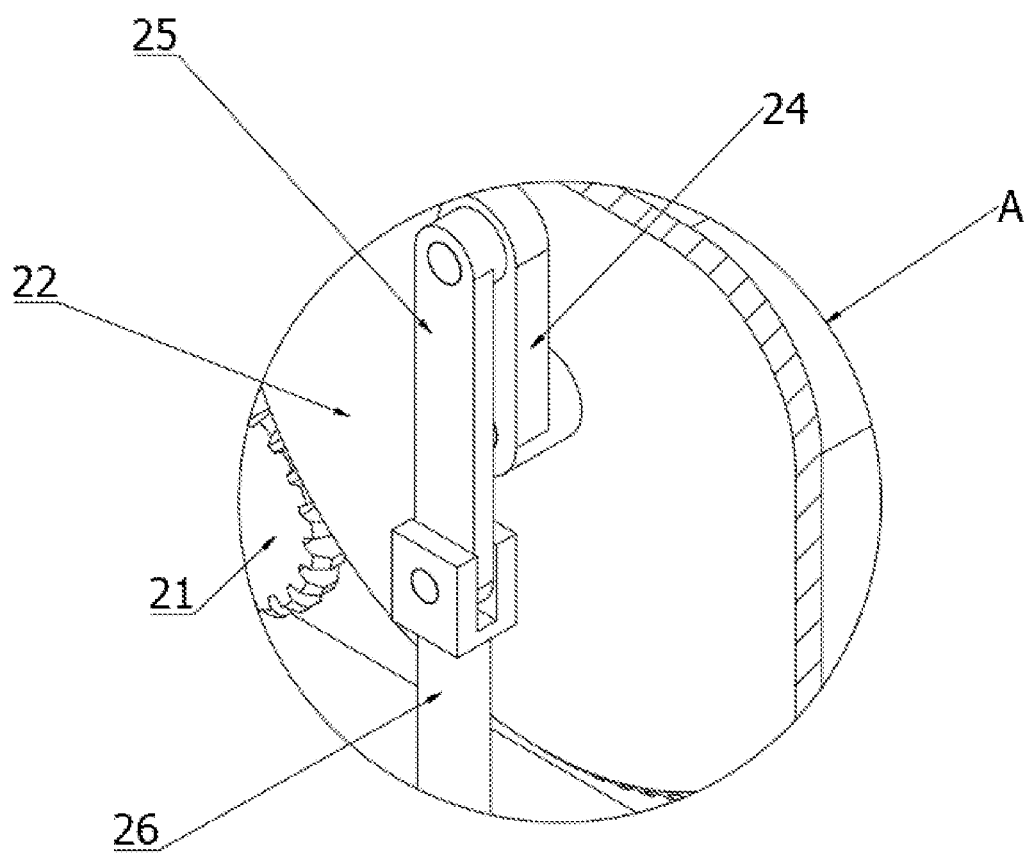
FIG. 6 is an enlarged view of a portion A in FIG. 4.
Figure 7:
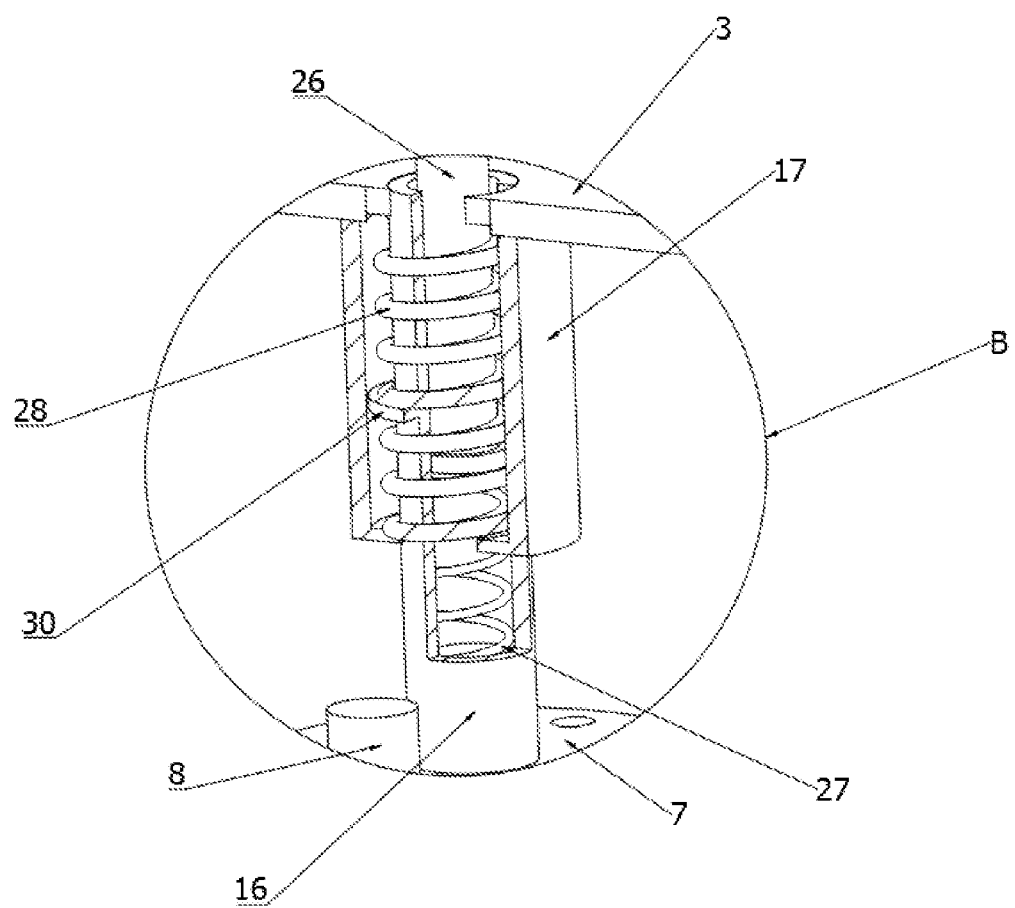
FIG. 7 is an enlarged view of a portion B in FIG. 5.

Please refer to FIGS. 1~7, a monitoring device for mangrove soil restoration provided by the disclosure includes a body 1, and each of four corners of a lower surface of the body 1 is provided with a locking universal wheel, which is convenient to move the device, and a locking device on the locking universal wheel can fix the device. A central position of the body 1 is provided with a piling hole 19 passing through the body 1, the body 1 is connected to a fixing ring 10, the fixing ring 10 is disposed above the pilling hole 19, a side of the fixing ring 10 is threaded with adjusting rods 11, a first end of each of the adjusting rods 11 is connected with a handle, a second end of each of the adjusting rods 11 opposite to the first end of each of the adjusting rods 11 is movably connected to a rotary wheel 12, and the rotary wheel 12 is disposed in the fixing ring 10. The adjusting rods 11 are adjusted to make the rotary wheels 12 always be vertical, and distances between the rotating wheels 12 are adjusted to fit different sampling pipes. An upper surface of the body 1 is connected to a frame 2, two inner surfaces of the frame 2 are provided with sliding grooves, the sliding grooves are movably connected to a pile device 3, a lower surface of the pile device 3 is provided with a round tube 17, and the round tube 17 is disposed above the pilling hole 19. The pile device 3 includes a housing, an outer surface of the housing is connected to a first motor 20, and an output end of the first motor 20 passes through the housing and connect to a first gear 21. A rotation shaft 23 is connected to the housing, the rotation shaft 23 passes through the outer surface of the housing from an inner of the housing, and a surface of the rotation shaft 23 is movably connected to a first surface of a second gear 22. The first gear 21 engages with the second gear, and a first end of a rotation rod 24 is movably connected to a central position of a second surface of the second gear 22 opposite to the first surface of the second gear 22. A second end of the rotation rod 24 opposite to the first end of the rotation rod 24 is movably connected to a first end of a connecting rod 25, a second end of the connecting rod 25 opposite to the first end of the connecting rod 25 is movably connected to a first end of a second push rod 26, and a first end of the second push rod 26 is connected to a first end of a first spring 27. A second end of the first spring 27 opposite to the first end of the first spring 27 is connected to an inside of a first push rod 16, the first push rod 16 passes through the round tube 17 and extends from a lower surface of the round tube 17, and an outer surface of the first push rod 16 is sleeved with a second spring 28. The second spring 28 is disposed in the round tube 17, the outer surface of the first push rod 16 is provided with a protrusion 30, and a surface of the protrusion 30 is clamped in middle of the second spring 28. A lower surface of the first push rod 16 is connected to a pressure plate 7, and a lower surface of the pressure plate 7 is provided with at least one rubber mat. The rubber mats reduce sounds and damages of the pressure plate 7 striking the sampling pipe. An upper surface of the pressure plate 7 is threaded with at least one pressure block 8, and pressure of the pressure plate 7 is adjusted by adjusting a number of the pressure blocks 8, which makes piling effects of the pile device 3 be better. An upper surface of the pile device 3 is provided with a ring 29, an upper surface of the frame 2 is provided with a second motor 5 and a pulley 4, an output end of the second motor 5 is connected to a rotary table 31, a first end of a wire rope 6 is connected to the rotary table 31, a second end of the wire rope 6 opposite to the first end of the wire rope 6 is connected to a hook 15, the wire rope 6 passes through the upper surface of the frame 2 through the pulley 4, and the hook 15 is in contact with the ring 29. Two sides of the frame 2 are provided with two fixing holes respectively, the two fixing holes are provided a stop rod 13 therethrough, and an upper surface of the stop rod 13 is in contact with the lower surface of the pile device 3. Two ends of the body 1 are provided with two hydraulic cylinders 9 respectively, two telescopic rods 91 of the two hydraulic cylinders 9 pass through the body 1, and the two telescopic rods 91 are connected to a support plate 18 individually. The ring 29 is disposed above the pile device 3, and the pile device 3 is pulled to a top of the frame 2 by pulling the ring 29 through the wire rope 6, then the pile device 3 is fixed on the frame 2 by the stop rod 13. The sampling pipe in the underground is pulled by the wire rope 6 later, which avoids manual pulling of the sampling pipe. The upper surface of the body 1 is provided with a battery pack 14, and the first motor 20 and the second motor 5 are applied power by the battery pack 14.

A working principle of the monitoring device of the present disclosure is as follows.

The monitoring device for soil restoration is moved to a position where need to be sampled, the two hydraulic cylinders 9 are started, and the two telescopic rods 91 of the two hydraulic cylinders 9 push the support plate 18 to move downward. When the support plate 18 contacts the ground, the body 1 moves upwards until all four universal wheels on the body 1 are off the ground. Then the hydraulic cylinders 9 are closed, a sampling pipe is added to the piling hole 19. The adjusting rods 11 are rotated, such that the adjusting rods 11 drive the rotary wheels 12 to compress the sampling pipe, so as to ensure that the sampling pipe is at the center of the piling hole 19. Therefore, the striking effect of the pile device 3 is the best.

Firstly, the hook 15 is hung on the ring 29, the second motor 5 is started to drive the rotary table 31 to rotate, so as to tighten the wire rope 6. The second motor 5 is turned off, and then the stop rod 13 is taken out from the frame 2. At this time, the hook 15 fixes the pile device 3 at an upper position of the frame 2. Under the action of gravity, the pile device 3 slides downward in the sliding groove. The second motor 5 is started, and the second motor 5 drives the rotary table 31 to rotate. The hook 15 pulls the ring 29, the ring 29 pulls the pile device 3 to let the pile driver 3 fall down slowly, so as to prevent the pile device 3 from falling directly, thus damaging the pile device 3. When the lower surface of the pressure plate 7 contacts an upper surface of the sampling pipe, the second motor 5 is turned off, the hook 15 is taken down, and a suitable number of pressure blocks 8 are added on the pressure plate 7 according to a required sampling depth.

The first motor 20 is started to drive the first gear 21 to rotate. The first gear 21 drives the second gear 22 to rotate, and the second gear 22 drives the rotation rod 24 to rotate. The rotation rod 24 drives the connecting rod 25 to rotate, and the connecting rod 25 drives the second push rod 26 to move downward in the first push rod 16. The second push rod 26 drives the first spring 27 to deform, and the first spring 27 drives the first push rod 16 to move downward under the effect of its own elasticity. The first push rod 16 moves downward in the round tube 17, and the protrusion 30 on the surface of the first push rod 16 drives the second spring 28 to move downward. The first push rod 16 drives the pressure plate 7 to move up and down, and the pressure plate 7 strikes the upper surface of the sampling pipe, thus driving the sampling pipe into the ground. When the rotation rod 24 is located above the second gear 22, the pressure plate 7 is lifted; and when the rotation rod 24 is located below the second gear 22, the pressure plate 7 falls, and under the action of a reaction force, the pile driver 3 slides upward and then falls down on the frame 2. The above actions are repeated to drive the sampling pipe into the ground.

The hook 15 is hung on the ring 29, and the second motor 5 is started to drive the rotary table 31 to rotate, so that the wire rope 6 is tightened on the rotary table 31. The wire rope 6 drives the hook 15 to move up, and the hook 15 pulls the ring 29 to move up. The ring 29 pulls the pile driver 3 to move up until the pile driver 3 moves at the upper position of the frame 2, and the second motor 5 is turned off. The stop rod 13 is inserted, and the hook 15 is taken down. The second motor 5 is started to make the hook 15 fall down. When the hook 15 falls above the sampling pipe, the second motor 5 is turned off, the sampling pipe is fixed through an external fixture. The hook 15 fixes the external fixture, and the second motor 5 is started, to enable sampling pipe to be pulled out of the ground.

The above embodiments are merely used to explain the technical solution of the disclosure, not to limit the disclosure. Although the disclosure has been described in detail with the above-mentioned embodiments, those skilled in the art should understand that they can still modify the technical solutions recorded in the above-mentioned embodiments, or they can replace some or all of the technical features equally. However, these modifications or substitutions do not make the essence of the corresponding technical solutions separate from the scope of the technical solutions of the embodiments of the disclosure.

What is claimed is:

1. A monitoring device for mangrove soil restoration, comprising a body (1), wherein each of four corners of a lower surface of the body (1) is provided with a locking universal wheel;

wherein a central position of the body (1) is provided with a piling hole (19) passing through the body (1);

wherein an upper surface of the body (1) is connected to a frame (2), two inner surfaces of the frame (2) are provided with sliding grooves, the sliding grooves are movably connected to a pile device (3), a lower surface of the pile device (3) is provided with a round tube (17), and the round tube (17) is disposed above the piling hole (19);

wherein two sides of the frame (2) are provided with two fixing holes respectively, the two fixing holes are provided a stop rod (13) therethrough, and an upper surface of the stop rod is in contact with the lower surface of the pile device (3);

wherein two ends of the body (1) are provided with two hydraulic cylinders (9) respectively, two telescopic rods (91) of the two hydraulic cylinders (9) are configured to pass through the body (1), and the two telescopic rods (91) are connected to a support plate (18) individually;

wherein the body (1) is connected to a fixing ring (10), the fixing ring (10) is disposed above the piling hole (19), a side of the fixing ring (10) is threaded with adjusting rods (11), a first end of each of the adjusting rods (11) is connected with a handle, a second end of each of the adjusting rods (11) opposite to the first end of each of the adjusting rods (11) is movably connected to a rotary wheel (12), and the rotary wheel (12) is disposed in the fixing ring (10);

wherein an upper surface of the pile device (3) is provided with a ring (29); and wherein an upper surface of the frame (2) is provided with a motor (5) and a pulley (4), an output end of the motor (5) is connected to a rotary table (31), a first end of a wire rope (6) is connected to the rotary table (31), a second end of the wire rope (6) opposite to the first end of the wire rope (6) is connected to a hook (15), the wire rope (6) is configured to pass through the upper surface of the frame (2) through the pulley (4), and the hook (15) is in contact with the ring (29).

2. The monitoring device for the mangrove soil restoration according to claim 1, wherein the pile device (3) comprises a housing, an outer surface of the housing is connected to another motor (20), and an output end of the another motor (20) is configured to pass through the housing and connect to a first gear (21);

wherein a rotation shaft (23) is connected to the housing, the rotation shaft (23) is configured to pass through the outer surface of the housing from an inner of the housing, and a surface of the rotation shaft (23) is movably connected to a first surface of a second gear (22);

wherein the first gear (21) is configured to engage with the second gear (22), and a first end of a rotation rod (24) is movably connected to a central position of a second surface of the second gear (22) opposite to the first surface of the second gear (22);

wherein a second end of the rotation rod (24) opposite to the first end of the rotation rod (24) is movably connected to a first end of a connecting rod (25), a second end of the connecting rod (25) opposite to the first end of the connecting rod (25) is movably connected to a first end of a second push rod (26), and a first end of the second push rod (26) is connected to a first end of a first spring (27);

wherein a second end of the first spring (27) opposite to the first end of the first spring (27) is connected to an inside of a first push rod (16), the first push rod (16) is configured to pass through the round tube (17) and extends from a lower surface of the round tube (17), and an outer surface of the first push rod (16) is sleeved with a second spring (28); and wherein the second spring (28) is disposed in the round tube (17), the outer surface of the first push rod (16) is provided with a protrusion (30), and a surface of the protrusion (30) is clamped in middle of the second spring (28).

3. The monitoring device for the mangrove soil restoration according to claim 2, wherein a lower surface of the first push rod (16) is connected to a pressure plate (7), and an upper surface of the pressure plate (7) is threaded with at least one pressure block (8).

4. The monitoring device for the mangrove soil restoration according to claim 3, wherein a lower surface of the pressure plate (7) is provided with at least one rubber mat.

5. The monitoring device for the mangrove soil restoration according to claim 1, wherein the upper surface of the body (1) is provided with a battery pack (14).

* * * * *